United States Patent [19]

Hata et al.

[11] Patent Number: 4,777,505
[45] Date of Patent: Oct. 11, 1988

[54] AUTOMATIC FOCUSING CONTROL SYSTEM

[75] Inventors: Daisuke Hata, Chiba; Susumu Iguchi, Kanagawa; Yoshimi Ohno, Kanagawa; Takao Yamaguchi, Kanagawa; Takayuki Hatase, Kanagawa; Kazumasa Aoki, Tokyo, all of Japan

[73] Assignee: Ricoh Company, Ltd., Tokyo, Japan

[21] Appl. No.: 928,164

[22] Filed: Nov. 7, 1986

[30] Foreign Application Priority Data

Nov. 8, 1985 [JP] Japan .................................. 60-250350

[51] Int. Cl.$^4$ .............................................. G03B 3/00
[52] U.S. Cl. .................... 354/402; 354/195.1
[58] Field of Search ................... 354/402–409, 354/400, 195.1

[56] References Cited

U.S. PATENT DOCUMENTS

| | | | |
|---|---|---|---|
| 4,156,563 | 5/1979 | Kato et al. | 354/405 |
| 4,247,187 | 1/1981 | Tamura | 354/409 X |
| 4,523,827 | 6/1985 | Masunaga et al. | 354/400 |
| 4,538,892 | 9/1985 | Sakai et al. | 354/402 |
| 4,572,643 | 2/1986 | Akashi | 354/409 |
| 4,573,784 | 3/1986 | Suzukji | 354/406 |

Primary Examiner—W. B. Perkey
Attorney, Agent, or Firm—Oblon, Fisher, Spivak, McClelland & Maier

[57] ABSTRACT

An automatic focusing control system includes a focus detecting light detector, a rangefinder, a lens driver, a manual range setting unit, a mode setting unit, and a control unit. When a manual mode is selected by the mode setting unit, the control unit applies a lens driving signal from the manual range setting unit to the lens driver unit to drive a lens. When an automatic mode is selected by the mode setting unit, the control unit operates the lens driver unit to drive the lens based on a measured distance at the time distance measurement is possible, applies the lens driving signal from the manual range setting unit to the lens driver unit at the time distance measurement is impossible, and operates the lens driver unit to drive the lens based on the measured distance at the time distance measurement becomes possible from a condition in which distance measurement is impossible.

7 Claims, 3 Drawing Sheets

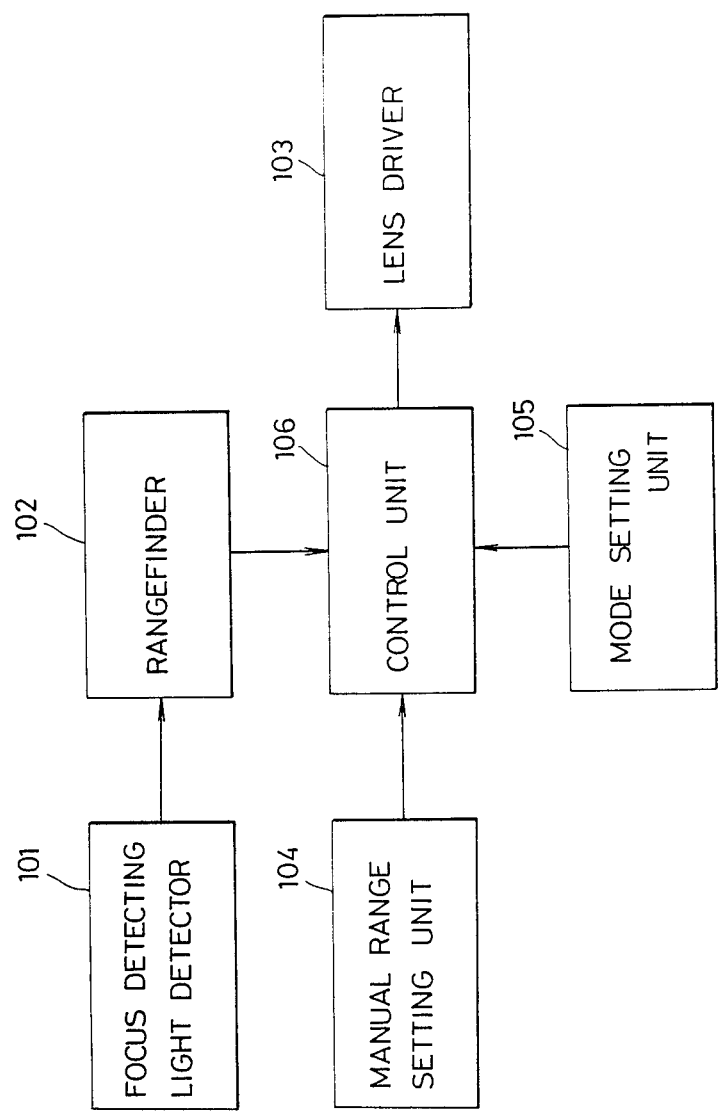

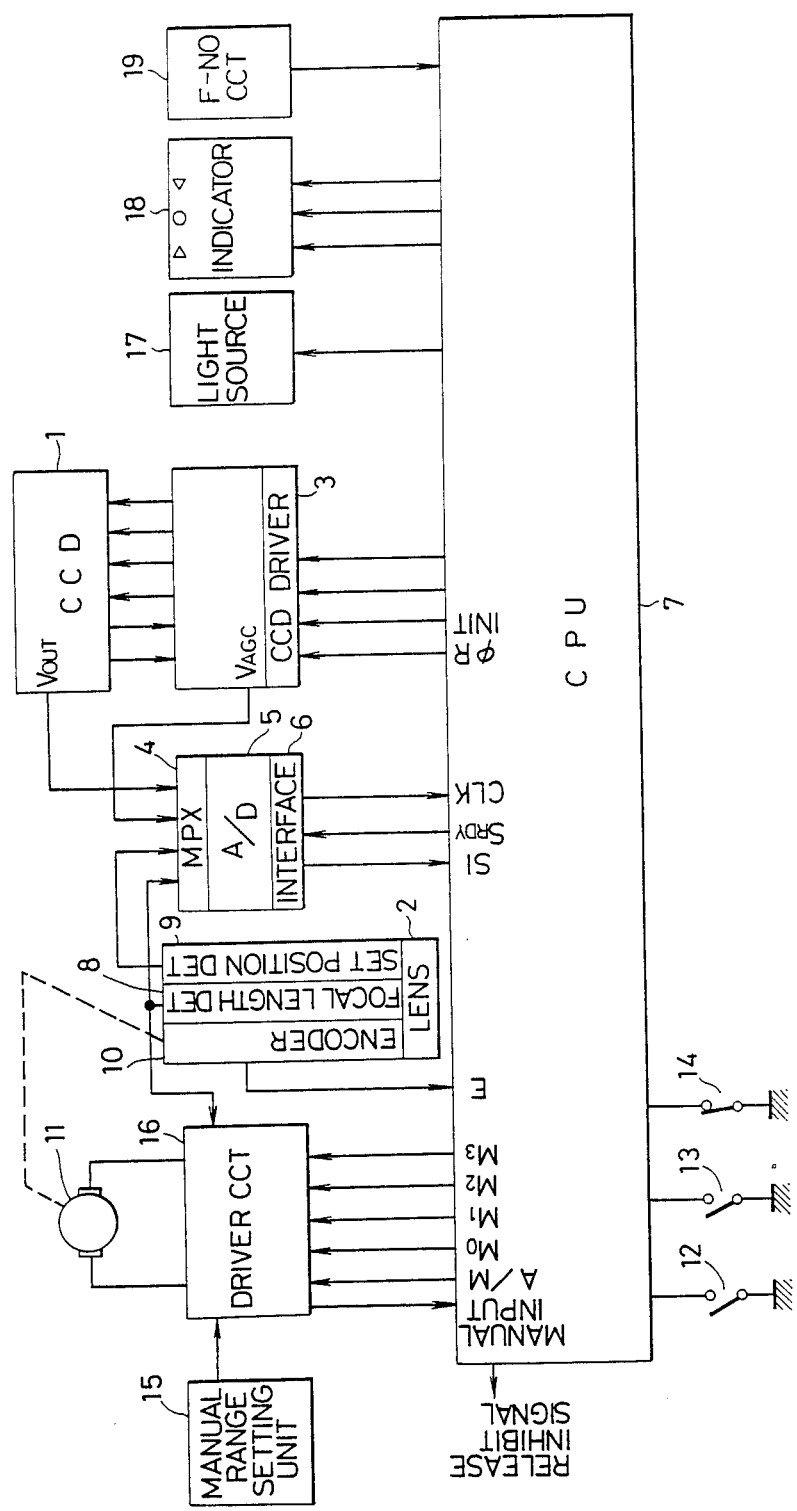

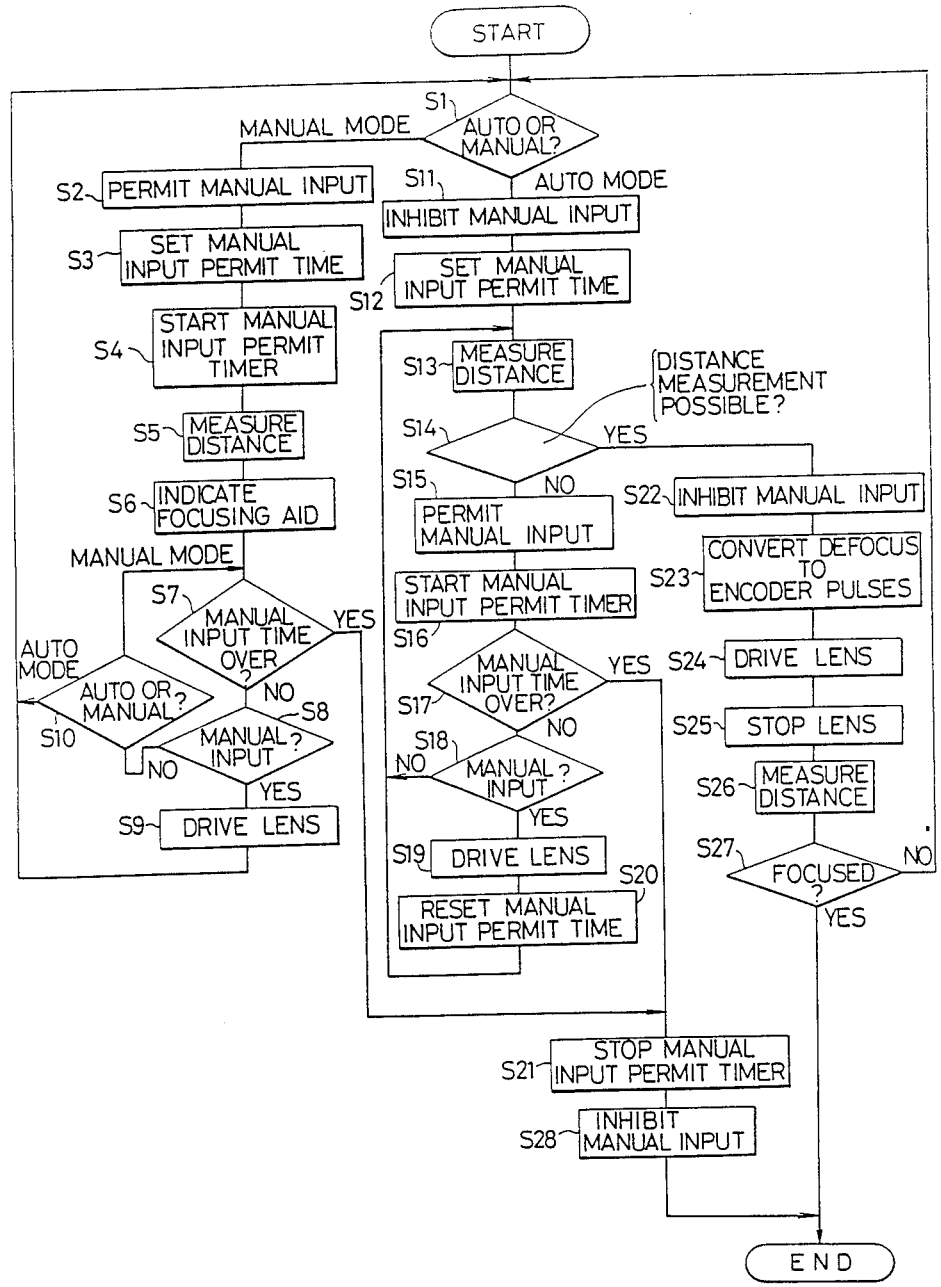

AUTOMATIC FOCUSING CONTROL SYSTEM

BACKGROUND OF THE INVENTION

1. Field of the Invention

The present invention relates generally to an automatic focusing control system for use in a camera or the like and more particularly to an automatic focusing control system which utilizes a manual setting if the automatic setting is unusable.

2. Description of the Prior Art

Certain automatic focusing control systems for cameras or the like operate in an automatic mode by automatically measuring the distance to an object to be photographed and by moving the lens into a focused position, and also operate in a manual mode by manually turning a distance or focusing ring to move the lens into a focused position. Such automatic focusing control systems make cameras inefficient to use since the distance ring must be manually turned in the manual mode. When the distance to the object cannot be measured, the camera must be manually switched from the automatic mode to the manual mode. When the distance to the object can thereafter be measured and the automatic mode is to be selected, it must be manually switched again from the manual mode back to the automatic mode. This makes the cameras more inefficient to use, sometimes resulting in the loss of desired picture opportunities.

SUMMARY OF THE INVENTION

It is an object of the present invention to provide an automatic focusing control system which makes a camera associated therewith efficient to use.

Another object of the present invention is to provide an automatic focusing control system which utilizes the manual setting if it is determined that the distance measurement cannot be made.

A further object of the present invention is to provide a method for controlling an automatic focusing system which is efficient to use.

According to the present invention, there is provided an automatic focusing control system for use in a camera having a photographic lens, comprising a focusing detecting light detector for detecting light that has passed through the lens, a rangefinder response to an output from the light detector for measuring a distance to an object to be photographed by the camera and for ascertaining whether a distance measurement is possible or not, a lens driver for driving the lens, a manual range setting unit which is manually operable for generating a lens driving signal, a mode setting unit for selecting either a manual and automatic mode, and a timer for establishing a period of time a control unit for applying the lens driving signal from the manual range setting unit to the lens driver unit when the manual mode is selected by the mode setting unit, the control unit being operable, when the automatic mode is selected by the mode setting unit, for operating the lens driver unit to drive the lens based on the measured distance when a distance measurement is possible, for applying the lens driving signal from the manual range setting unit to the lens driver unit when a distance measurement is impossible, during said period of time and for operating the lens driver unit to drive the lens based on the measured distance when a distance measurement becomes possible after having a condition in which distance measurement is impossible.

The above and other objects, features and advantages of the present invention will become more apparent from the following description when taken in conjunction with the accompanying drawings.

BRIEF DESCRIPTION OF THE DRAWINGS

FIG. 1 is a block diagram of an automatic focusing control system according to the present invention;

FIG. 2 is a detailed block diagram of the automatic focusing control system of the present invention; and FIG. 3 is a flowchart of an operation sequence of a CPU of the automatic focusing control system.

DETAILED DESCRIPTION

Various other objects, features and attendant advantages of the present invention will be more fully appreciated as the same becomes better understood from the following detailed description when considered in connection with the accompanying drawings in which like reference characters designated like or corresponding parts throughout the several views and wherein as shown in FIG. 1, an automatic focusing control system according to the present invention generally comprises a focus detecting light detector 101, a rangefinder 102, a lens driver 103, a manual range setting unit 104, a mode setting unit 105, and a control unit 106. Light that has passed through a camera lens is detected by the light detector 101, which applies an output signal to the rangefinder 102 that measures the distance to an object to be photographed and ascertains if a distance measurement is possible or not. The lens is driven by the lens driver 103. The manual range setting unit 104 is manually actuated to produce a lens driving signal. Manual and automatic modes are selected by the mode setting unit 105. In the manual mode, the control unit 106 applies the lens driving signal from the manual range setting unit 104 to the lens driver 103. In the automatic mode, the control unit 106 operates the lens driver 103 based on the measured distance if a distance measurement is possible as determined by the rangefinder 102. If a distance measurement is not possible, then the control unit 106 applies the lens driving signal from the manual range setting unit 104 to the lens driver 103, and operates the lens driver 103 based on the measured distance when a distance measurement becomes possible.

The automatic focusing control system of the invention will be described in greater detail with reference to FIG. 2.

Light coming from an object to be photographed and having passed through a photographing lens 2 of a camera forms an image on a focus detecting charge-coupled device (CCD) 1 which is driven by a CCD driver 3. An output signal from the CCD 1 is applied through a multiplexer 4 to an analog-to-digital converter 5 which converts the analog signal to a digital signal. The digital signal is then applied through an interface 6 to a microcomputer (hereinafter referred to as a "CPU") 7. The CPU 7 computes, from the output signal of the CCD 1, a deviation of the image on the CCD 1 from a focused position, and converts the computed deviation to a defocused amount of the lens 2, for thereby measuring the defocus distance and ascertaining whether a distance measurement is possible or not. The focal length of the lens 2, and the position in which the lens 2 is set are detected by detectors 8 and 9, respectively. Output signals from the detectors 8 and 9 are applied through the multiplexer 4, the analog-to-digital converter 5, and the interface 6 to the CPU 7 for enabling the CPU 7 to measure the distance. An encoder 10 serves as a rotation detector for detecting the rotation of a motor 11 which drives the lens 2. Pulses from the encoder 10 and signals from manually actuated switches 12, 13, 14 are applied to the CPU 7. The switch 12 serves to effect switching between the manual mode and the automatic mode. The switch 13 is a power supply switch comprising a release switch which is turned on when a shutter release button is depressed. The switch 14 serves to set an adjustment mode. A manual range setting unit 15 is manually operated to generate a signal for rotating the motor 11 and comprises switches. A driver circuit 16 is controlled by the CPU 7 to rotate the motor 11 in response to the signal from the manual range setting unit 15 or the CPU 7. When the object is dark, the CPU 7 turns on a light source 17 to apply auxiliary light to the object. The CPU 7 enables an indicator or visual focusing aid 18 to indicate whether the image is sharply focused, overfocused, or underfocused. The CPU 7 receives an open F number of the lens 2 from an F-number circuit 19 for use in distance measurement.

Operation of the CPU 7 will be described with reference to FIG. 3.

The CPU 7 starts to operate when the power supply switch 13 is turned on. The CPU responds to a signal from the switch 12 for determining whether the manual mode or the automatic mode is selected in step S1. If the switch 12 is turned on and hence the manual mode is selected, then control goes to step S2 which permits a manual input to be applied the driver circuit 16, i.e., a signal to be applied from the manual range setting unit 15 to the driver circuit 16. The CPU 7 thereafter sets a time for a manual input permit timer in step S3, and then starts the manual input permit timer in step S4. The CPU 7 receives an output signal from the CCD 1 to measure the distance in step S5, and indicates a focus condition on the indicator 18 in step S6. A step S7 ascertains whether the time of the manual input permit time is over or not. If the time is not over, control proceeds to step S8 which ascertains if there is a manual input or not. If there is a manual input, then the motor 11 is rotated by the manual input in step S9, followed by the processing going back to the step S1. If there is no manual input in step S8, then step S10 ascertains if the automatic mode or the manual mode is selected on the basis of the signal from switch 12. If switch 12 is turned on and hence the manual mode is selected, then control goes back to step S7. If switch 12 is turned off and the automatic mode is selected, then control returns to the step S1. If the time is over in step S7, then control goes to step S21 to stop the manual input permit timer, and then to step S28 in which a manual input is inhibited.

If the automatic mode is selected in step S1, the processing goes to step S11 to inhibit a manual input to the driver circuit 16, and then to step S12 to set a time for the manual input permit timer. Thereafter, the CPU 7 receives an output signal from the CCD 1 to measure the distance in step S13 and also to acertain whether a distance measurement is possible or not (whether there are conditions in which the distance can be measured) in step S14. If a distance measurement is possible, then control goes to step S22 to inhibit a manual input to the driver circuit 16. Then, step S23 converts the defocused amount (the result of the distance measurement) to a number of pulses of the encoder 10, and step S24 counts the pulses of the encoder 10 and enables the driver circuit 16 to rotate the motor 11 for an angular interval corresponding to the converted number of pulses. Then, CPU 7 commands the driver circuit 16 to de-energize the motor 11 in step S25, and then measures the distance based on the output signal from the CCD 1 in step S26. The CPU 7 ascertains in step S27 whether the lens 2 is in the focused position. If not, then control goes back to step S1, and repeats steps S1, S12 through S14, S22 through S27 until the lens 2 reaches the focused position.

If a distance measurement is not possible in the step S14, then the processing proceeds to step S15 to permit a manual input and thereafter to step S16 to start the manual input permit timer, followed by step S17 which ascertains whether the time of the manual input permit timer is over or not. If the time is not over, then step S18 determines whether there is a manual input or not. If no manual input is present, then control returns to step S13. If there is a manual input, then control goes on to step S19 in which the CPU 7 enables the driver circuit 16 to drive the lens 11 in response to the manual input. Thereafter, a time is set again for the manual input permit timer in step S20, from which control returns to step S13. Therefore, whether a distance measurement is possible or not is always ascertained (insofar as the power supply switch 13 is turned on), and when a distance measurement becomes possible, focusing control is automatically performed. If the time of the manual input permit timer is over in step S17, then control goes to step S21 in which the manual input permit timer is stopped. Thereafter, control goes on to the step S28 to inhibit a manual input.

With the arrangement of the present invention, as described above, the camera incorporating the automatic focusing control system can efficiently be handled since when the manual range setting unit is operated in the manual mode, the lens is moved. If distance measurement becomes impossible in the automatic mode, then the lens can automatically be moved by the manual range setting unit, and if a distance measurement later becomes possible, then the focus adjustment can automatically be carried out. Therefore, the camera can highly efficiently be used without the danger of losing desired picture opportunities.

Although a certain preferred embodiment has been shown and described, it should be understood that many changes and modifications may be made therein without departing from the scope of the appended claim.

What is claimed is:

1. An automatic focusing control system for use in a camera having a photographic lens, comprising:
   a focusing detecting light detector for detecting light that has passed through the lens;
   range finder means responsive to an output from said light detector for measuring the defocus distance of an object to be photographed by the camera and for ascertaining whether a distance measurement is possible or not;
   lens driver means for driving the lens;
   manual range setting means which is manually operable for generating a lens driving signal;
   mode setting means for selecting one of a manual and automatic mode;
   timing means for establishing a period of time; and
   control means for applying the lens driving signal from said manual range setting means to said lens driver means when the manual mode is selected by said mode setting means, said control means being operable, when the automatic mode is selected by said mode setting means, for operating said lens driver means to drive the lens based on the defocus distance when a distance measurement is possible, for applying the lens driving signal from said manual range setting means to said lens drive means when a distance measurement is impossible during said period of time, and when the automatic mode is selected by said mode setting means for operating said lens driver means to drive the lens based on the measured distance when a distance measurement becomes possible during the application of the lens driving signal from said manual range setting means when the distance measurement is impossible.

2. An automatic focusing control system according to claim 1, wherein said manual range setting means includes switches.

3. An automatic focusing control system according to claim 1, wherein said focusing detecting light detector includes a charge-coupled device.

4. An automatic focusing control system according to claim 1, wherein said control means is a microcomputer.

5. An automatic focusing control system according to claim 1, further comprising indicator means connected to said control means for indicating whether the image is sharply focused.

6. An automatic focusing control system for use in a camera having a lens, comprising:
   first means for detecting light that has passed through a lens and determining whether a distance measurement is possible;
   lens driver means for driving the lens;
   means for manually setting the range;
   timing means for establishing a period of time; and
   control means for operating said lens driver means automatically based on the measured distance when a distance measurement is possible, for operating said lens driver means in response to said means for manually setting the range when a distance measurement is impossible during said period of time and for operating said lens driver means automatically when a distance measurement is possible during the operation of said lens driver means in response to said means for manually setting the range.

7. An automatic focusing control system for use in a camera having a photographic lens, a focusing detecting light detector, a range finder, a lens driver, a manual range setting means and a mode selection means, comprising the steps of:
   detecting when light has passed through the lens by way of said focusing detecting light detector,
   determining if a distance measurement is possible and what the distance measurement is by said range finder means;
   determining the setting in said manual range setting means;
   determining whether said mode setting means indicates manual or automatic modes;
   determining a period of time; and
   controlling said lens driver means in accordance with the manual range setting means when the manual mode is selected;
   controlling said lens driving signal in accordance with the measured distance when the automatic mode is selected and a distance measurement is possible; and
   controlling said lens driving means in accordance with said manual range setting when the automatic mode is selected and a distance measurement is impossible during said period of time;
   controlling said lens driving means in accordance with said measured distance when the automatic mode is selected and when a measured distance becomes possible during the controlling in accordance with the manual range setting.

* * * * *